United States Patent [19]
Blodgett

[11] 4,209,308
[45] Jun. 24, 1980

[54] SORPTION SYSTEM

[76] Inventor: Gerry A. Blodgett, 38 June St., Worcester, Mass. 01602

[21] Appl. No.: 710,573

[22] Filed: Aug. 2, 1976

Related U.S. Application Data

[63] Continuation of Ser. No. 573,727, May 1, 1975, abandoned, which is a continuation-in-part of Ser. No. 478,452, Jun. 12, 1974, abandoned, which is a continuation of Ser. No. 291,911, Sep. 25, 1972, abandoned.

[51] Int. Cl.² .............................................. B01D 53/06
[52] U.S. Cl. .......................................... 55/179; 55/75; 55/78; 55/181; 55/390
[58] Field of Search ......................................... 55/73-75, 55/77-79, 179, 390

[56] References Cited

U.S. PATENT DOCUMENTS

| | | | |
|---|---|---|---|
| 2,639,000 | 5/1953 | Edwards | 55/179 |
| 2,992,065 | 7/1961 | Feustel et al. | 55/79 |
| 3,201,921 | 8/1965 | Heyes | 55/179 X |
| 3,231,492 | 1/1966 | Stine et al. | 55/208 X |
| 3,243,938 | 4/1966 | Lavery et al. | 55/62 |
| 3,401,504 | 9/1968 | Moragne | 55/179 |
| 3,487,608 | 1/1970 | Graff | 55/179 X |
| 3,490,201 | 1/1970 | Colvin et al. | 55/34 |

*Primary Examiner*—Robert H. Spitzer
*Attorney, Agent, or Firm*—Gerry A. Blodgett

[57] ABSTRACT

A system in which an incoming fluid stream containing a polar impurity is separated into a stream rich in impurity and a stream weak in the impurity. A hot fluid stream is cooled. A solid sorbent system extracts the impurity from the cool zone and returns it to the hot zone. A side stream carries off impurity which accumulates between the zones.

9 Claims, 9 Drawing Figures

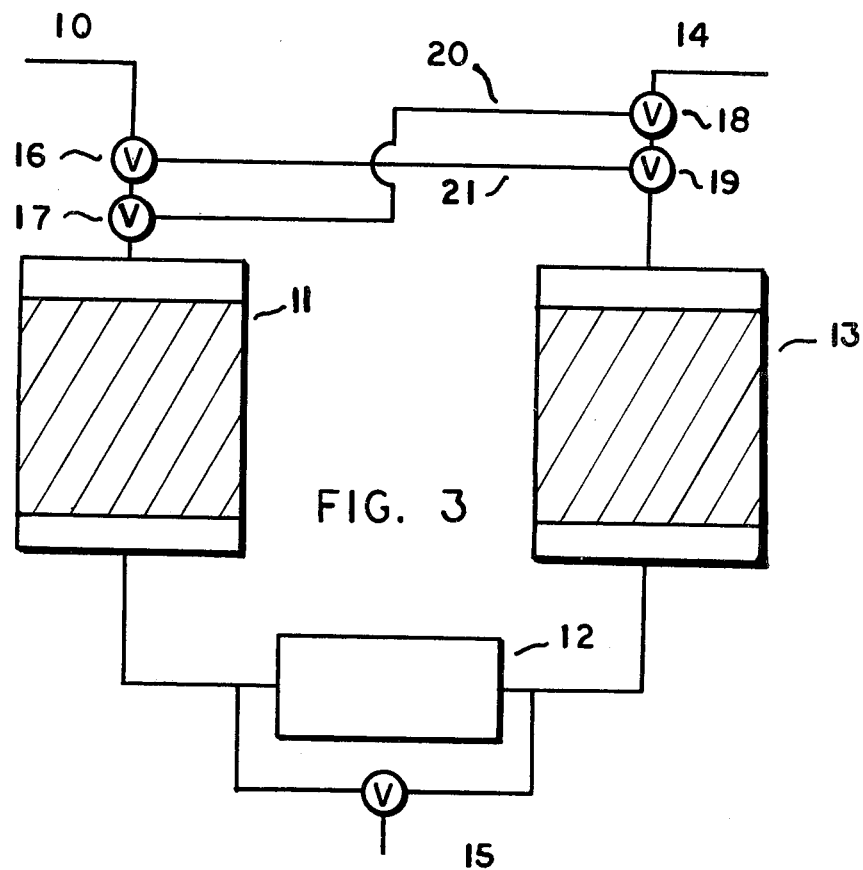
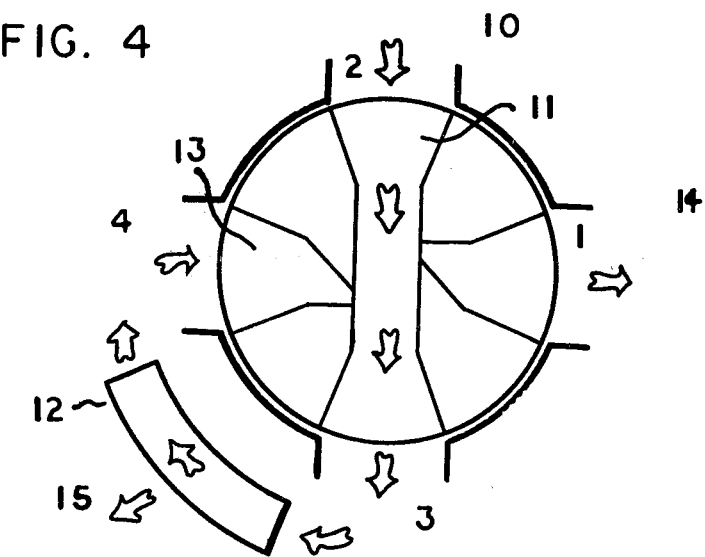

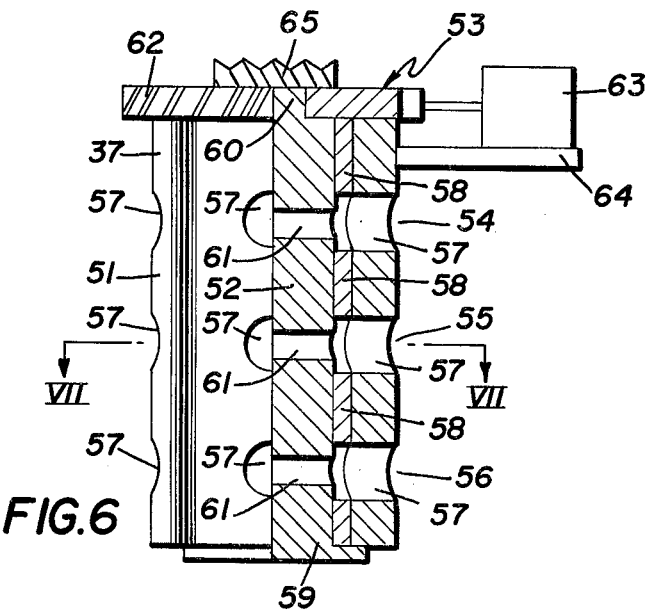
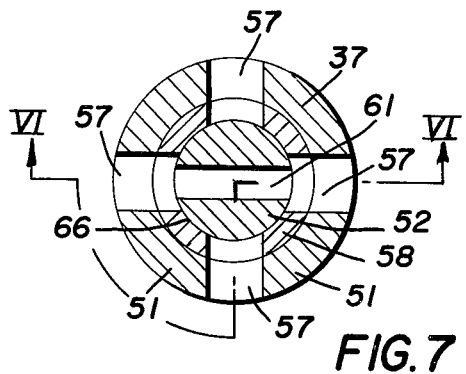
FIG.6    FIG.7
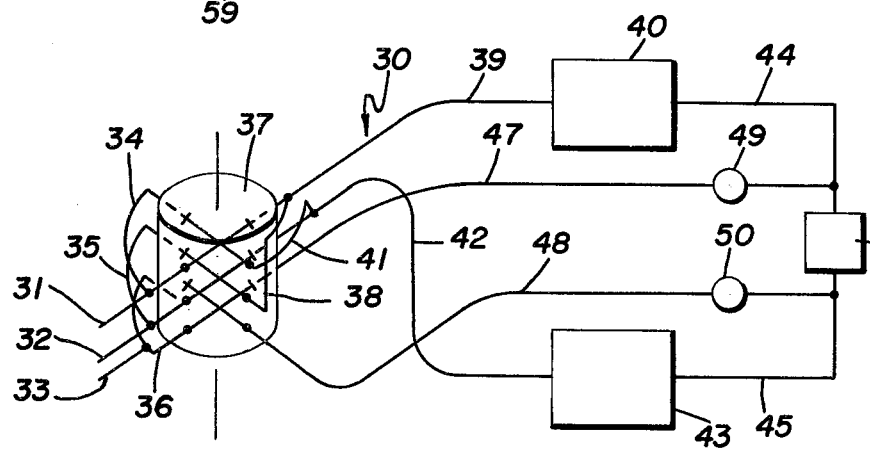
FIG.5
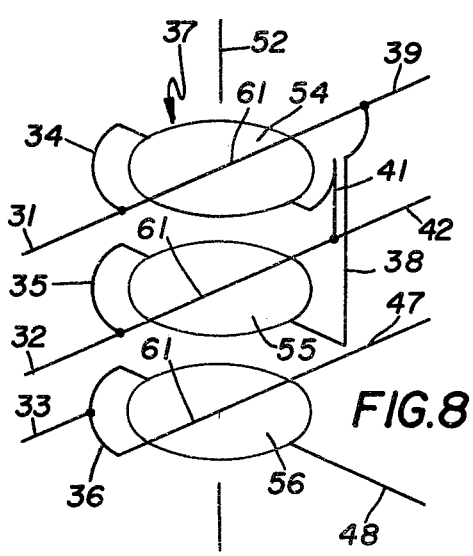
FIG.8
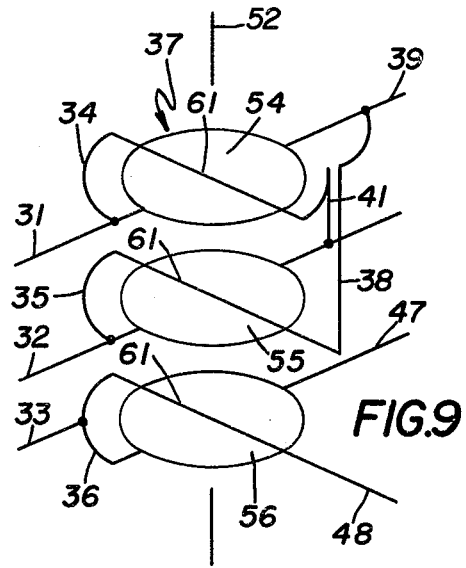
FIG.9

SORPTION SYSTEM

CROSS-REFERENCE TO RELATED APPLICATIONS

This is a continuation of application Ser. No. 573,727 filed May 1, 1975, now abandoned, which is a continuation-in-part of prior application Ser. No. 478,452 filed June 12, 1974, now abandoned, which is in turn a continuation of prior application Ser. No. 291,911 filed Sept. 25, 1972, now abandoned.

BACKGROUND OF THE INVENTION

The removal of various polar gaseous polutants such as $SO_2$ from the gaseous effluent of industrial smoke stacks is a project of top priority among environmentalists. Industrial sources of $SO_2$ can be divided into two types, those with rich effluent (2,500–500 ppm $SO_2$) such as smelting plants, and those with lean effluent (500–100ppm) such as electric power plants. The latter are far more numerous and by far the leading $SO_2$ pollution source. The reduction of $SO_2$ effluent concentration to the 500 ppm level is a fairly developed process which can be done at close to break-even economics. The reduction to below the 100 ppm level, which is presently being studied internationally due to proposed legal limits in that range, has proved to be a far less economically solvable problem.

The numerous approaches by which the problem has been attacked may be divided into basic types. First, processes that were successful in cleaning highly concentrated streams were applied to the cleaning of dilute streams. Process equipment sizing and reaction kenetics made these processes either unworkable or very expensive. In another type of system, the pollutants were absorbed or chemisorbed onto a substrate which was then discarded; this method simply changed the form of the pollution and when it was sold on the market it generally destroyed the value of the commodity in the market. In neither case was the process economically feasible. Still another type of process involved adsorption or sorption of the pollutants on a substrate and the subsequent regeneration of the pollutant by heat. Parenthetically, it might be a good idea at this point, to explain what is meant by the terms "absorption" or "chemisorption" versus "adsorption". In the first instance, the pollutant and the substrate react chemically, irreversibly forming a new substance. In the latter, the two materials are held together by surface attraction and simple heat can drive them apart. The term "sorb" or "sorption" refers to an instance in which generally reversible attraction is present but the exact nature of the surface attraction phenomena is not presumed. Returning to the sorption methods, most of the work done in this area has involved attempts at carrying existing adsorption processes into the pollution area. They are generally not suited for hot, "dirty" streams or low concentrations and have received little attention from public and private funding agencies. Thus, the various systems for $SO_2$ pollution abatement are, at present, either uneconomical, uneffective, or not developed to a practical stage.

These and other difficulties experienced with the prior art devices have been obviated in a novel manner by the present invention.

It is, therefore, an outstanding object of the invention to provide a sorption system which divides a hot fluid stream containing a medium concentration of an impurity into a stream of rich concentration and a cool stream of weak concentration.

Another object of this invention is the provision of a sorption system which is suitable for extracting impurities from the effluent of a fossil fuel burning furnace.

A further object of the present invention is the provision of a sorption system which is adaptable to any separation involving adsorbents, particularly octane benefication of hydrocarbon fuels.

It is another object of the instant invention to provide a sorption system which is simple and inexpensive.

With the foregoing and other objects in view, which will appear as the description proceeds, the invention resides in the combination and arrangement of steps and the details of the system and process hereinafter described and claimed, it being understood that changes in the precise embodiment of the invention herein disclosed may be made within the scope of what is claimed without departing from the spirit of the invention.

SUMMARY OF THE INVENTION

This invention concerns a system and process for dividing a hot stream containing a medium concentration of an impurity into a stream of high concentration and a stream of low concentration. The process involves the exchange of two zones of sorbent between the hot and cooled zone of a gas stream and the topping of the high concentration zone which will develop between them.

BRIEF DESCRIPTION OF THE DRAWINGS

The character of the invention, however, may be best understood by reference to one of its structural forms, as illustrated by the accompanying drawings, in which:

FIG. 3 is a diagrammatic representation of another sorption system embodying the principles of the present invention, FIG. 4 is a diagrammatic representation of another sorption system embodying the principles of the present invention, FIG. 5 is a diagrammatic representation of another sorption system embodying the principles of the present invention, FIG. 6 is a detailed view in partial section of a valve used in the system shown in FIG. 5, FIG. 7 is a cross-sectional view taken along line VII—VII in FIG. 6, FIG. 8 is a diagrammatic representation of the valve in a first position, and FIG. 9 is a diagrammatic representation of the valve in a second position.

DESCRIPTION OF THE PREFERRED EMBODIMENT

In order to understand the basic concepts of the present invention, some ideas about adsorption of fluids on molecular sieve zeolites, such as faujasite and mordenite, must be understood.

Molecular sieve zeolites are a family of inorganic crystals found in vast quantities in various parts of the world and manufactured synthetically. One quality of zeolites is that they are capable of adsorbing large quantities of certain compounds (up to 35 wt.%). This large capacity coupled with molecular selectivity which can be tailored to discriminate small differences in molecular size or polarity, have been used to carry out some rather amazing separations. The remarkable ability of these sorbents to extract polar molecules, such as $SO_2$ and $NO_x$, from mixtures of gas has suggested their use in the removal of these pollutants from the gaseous effluent of fossil fuel burning furnaces.

Figure 1:
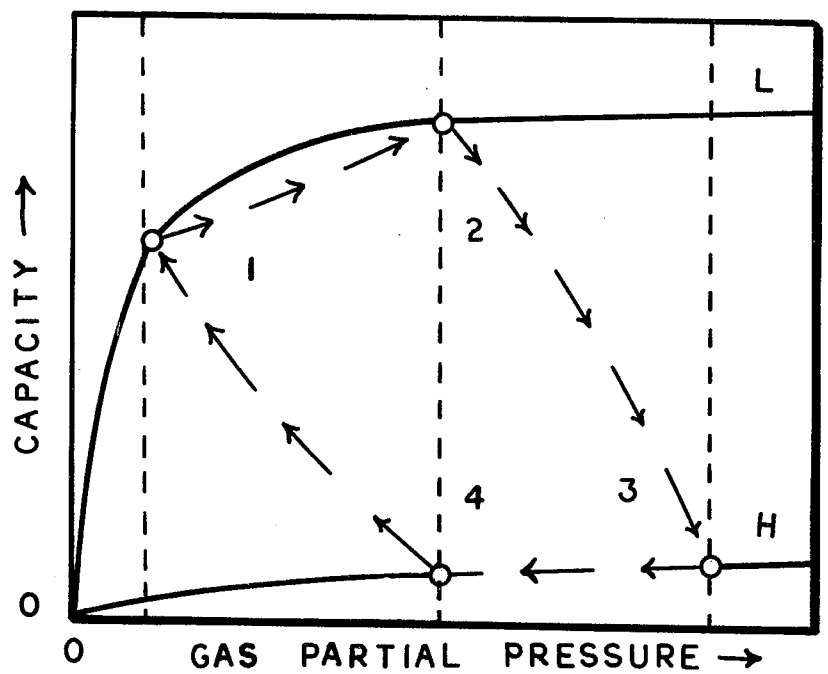
FIG. 1 is a diagrammatic sorption capacity versus partial gas pressure for a polar gas on a sorbent.

The nature of adsorption is such that certain phenomena prevail. First, adsorption is reversible; that is, if a hot system of zeolite and gas is cooled, the gas will be increasingly adsorbed by the zeolite. If the system is then reheated, the gas will be progressively desorbed. Other phenomena are seen in FIG. 1. The graph shows $SO_2$ wt.% adsorbed as a function of $SO_2$ pressure and temperature. The temperature function is shown as a line or isotherm, line L representing an isotherm at room temperature and H represents an isotherm at about 330° C., the temperature that effluent leaves the final heat exchanger in a typical steam generating unit. It should be noted that although capacity increases with gas pressure in both cases, it never becomes significant at the high temperature, while at the low temperature, the capacity jumps very rapidly and then levels off.

In order to follow the present invention on the capacity graph, a gas stream must be pictured. The stream starts at 330° C. with a $SO_2$ concentration of 300 ppm. The stream passes through a hot zone and through a cooler which chops the temperature to room temperature. Then, the gas moves through a cool zone and out a smoke stack. In this invention, solid sorbent is circulated between the zones.

Starting at point 1 of FIG. 1, the sorbent is positioned downstream in the cool gas zone. At this point, the sorbent is cool and loaded with polar gas, having purged the gas stream to an extremely low concentration. The sorbent is moved to point 2 upstream in the hot region of gas. From points 2 to 3 the sorbent flows with the hot gas stream. As the sorbent flows, it is heated and empties its sorbed gas into the stream. The result is an enriching of the stream. At point 3, the sorbent is separated from the gas and moved to point 4. Between points 4 and 1, the sorbent flows with the cooled gas. As the sorbent flows, it is cooled and sorbs from the previously enriched stream, nearly all of the polar gas. The sorbent returns to point 1 and the cycle starts again.

If a slug of gas is followed, it enters the system hot and of medium impurity concentration. As the gas passes through the hot sorbent zone, it is enriched to high concentration. A side stream of this high temperature gas is taken at this point or just after the cooler. The enriched main stream is passed through the cooler and into the cool sorbent zone. In the cool sorbent zone, the impurity is almost completely removed from the exit stream and carried by the sorbent back to the hot zone. The continuous recycle of the impurity gas results in the imput stream of medium concentration being divided into an exit stream of low concentration and a side stream of high concentration.

The hardware necessary to realize the concept of the present invention may be viewed in two ways. In one case, the gas flow path is stationary and the sorbent is cycled. In another case, the sorbent beds are fixed and the gas stream is rerouted. Each approach has good and bad features.

Figure 2:
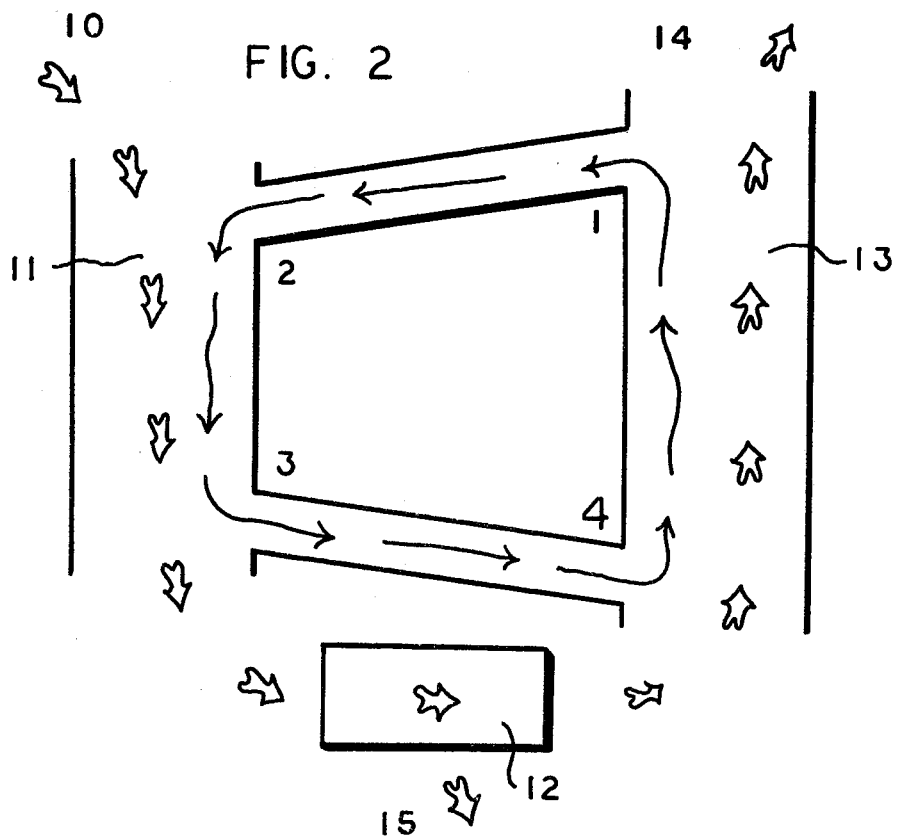
FIG. 2 is a diagrammatic representation of a sorption system embodying the principles of the present invention.

FIG. 2 shows a diagrammatic representation of a process of the first type (moving sorbent). The gas stream (shown by the large arrows) begins at point 10 as a dry air mixture at 330° C. and containing 200 ppm of $SO_2$. The stream passes through a hot zone 11 where it contacts a moving bed of 1/16' self-bonded Na-mordentite pellets sold by Norton Company of Worcester, Mass. under the tradename "Zeolon". In this zone the pellets are heated and thus emptied of any adsorbed gas. The enriched stream is separated from the pellets and moves to a cooler 12. Here the gas is cooled to room temperature and fed to the cool zone.

The empty pellets are mixed with the upward moving stream at the bottom of the cool zone 13 and the stream air-lifts the pellets to the top of the zone. In the process of lifting the pellets, they are cooled and loaded with $SO_2$. The resulting gas exits from a stack 14, generally devoid of $SO_2$. The transfer of the pellets is accomplished by gravity except for the air-lift in the cool zone 13.

In the start up of this system, the $SO_2$ will accumulate in the path between the two zones, eventually overwhelming the clean-up capacity of the cool zone 13. The result would be breakthrough of $SO_2$ to the stack 14. Just before this condition occurs, the slip stream 15 strips a portion of this high concentration gas, closing the mass balance and allowing a steady-state situation in which a low concentration stream exits the stack 14 and a high concentration stream exits the slip stream 15. This high concentration stream is fed to a commercial treatment plant mentioned previously. It can be hot or cold depending on whether it is taken before or after the cooler.

The other configuration mentioned, is shown in FIG. 3. In this set-up, valves 16, 17, 18 and 19 and lines 20 and 21 allow rerouting of the gas stream rather than moving the sorbent beds. The details of operation parallel those of the first design.

Another variation of the moving sorbent design is shown in FIG. 4. Here, a rotating drum 22 is divided into 8 segments, with diametrically opposed segments being connected through the central axis. The drum is loaded with sorbent. The gas stream is directed through the rotating zone perpendicular to its axis, through the cooler 12 and then run through the drum but this time perpendicular to the first pass. The result is the same as in the other designs, a loaded bed is continuously being presented to the hot stream and an unloaded bed to the cool stream.

Still another variation in the present invention involves a combination of the concepts showing FIGS. 3 and 4. The combination is shown in FIGS. 5–9 and involves a single constantly driven valve which replaces all of the valves in the arrangement shown in FIG. 3. The single valve system 30 involves an input line 31, an output line 32, and a slip stream line 33. These lines run into manifolds 34, 35, and 36, respectively, which, in turn, run into valve 37. Also connected to valve 37 is manifold 38 which is connected through line 39 to sorbent bed 40. Similarly, the valve 37 is connected to manifold 41 which is connected through line 42 to a second sorbent bed 43. Lines 44 and 45 connect a cooler 46 between the sorbent beds 40 and 43. Slip stream lines 47 and 48 are connected to lines 44 and 45, through reducing valves 49 and 50, and to the valve 37.

Referring now to FIG. 6, the valve 37 consists of a cylindrical outer jacket 51, a cylindrical inner core or drum 52 coaxial with the outer jacket, and a driving means 53 which causes constant, relative rotation between the outer jacket 51 and the inner core 52. The outer shell 51 is divided into three axially spaced levels 54, 55 and 56. Each level is defined by a plane perpendicular to the axis of the outer shell 51 and each level has four radial bores 57 which are spaced evenly around the periphery of the outer shell 51. Fixed to the inner surface of the outer cylinder 51 is a resilient cylinder 58 which forms a seal between the outer jacket 51 and the inner core 52. The bores 57 pass through the cylinder 58. In the preferred embodiment the cylinder 58 would be formed of polytetrafluoroethylene.

The inner core 52 is a solid cylinder having a radially extending flange 59 at one end and a non-cylindrical stem 60 at the other end. The flange 59 extends beyond the inside circumference of the outer jacket 51 and thus limits the passage of the inner core 52 through the outer jacket 51. The stem 60 is non-cylindrical to allow positive engagement with the driving means 53.

Three bores 61 pass radially through the inner core 52. The bores 61 have coplaner axes in the preferred embodiment to allow ease of manufacture. The bores 61 are spaced along the axis of the inner core 52 so that when the flange 59 is in contact with the outer jacket 51, the bores 61 lie at levels 54, 55, and 56 and the axes of bores 61 can be made co-extensive with the axes of bores 57 by rotating the inner core with respect to the outer jacket.

The driving means 53 consists of a worm gear 62 attached to the stem of the inner core 52, a motor 63 attached to the outer jacket 51 by bracket 64 and a worm 65. The motor 63 drives the worm 65 which, in turn, drives the worm gear 62. This causes constant axial rotation between the outer jacket 51 and the inner core 52.

FIG. 7 is a cross-sectional view looking down the axes of the valve 37 at level 55. It can be seen that by rotating inner core 52 with respect to outer core 51 and cylinder 58, the communication between bore 61 and the various bores 57 can be changed. Because all three levels 54, 55, and 56 share common outer jacket and inner core, the changes in relative position between the various bores are all occurring simultaneously. It should be noted, however, that by judicious positioning of the bores 61 and bores 57, the actual communication changes between the various bores need not be simultaneous and can be designed to suit specific needs. In the preferred embodiment, the diameter of the bore 61 is slightly less than the smallest distance measured along the inner surface of the cylinder 58 between adjacent bores 57. This distance 66 will be called the minimum seal distance for the purpose of this application. The equality of the diameter of bore 61 and the minimum seal distance means that as the inner core 52 rotates to change communication between adjacent bores 57, the bore 61 passes through an intermediate position at which its mouth is completely sealed by the cylinder 58. In the preferred embodiment the minimum seal distance would be slightly larger than the diameter of the bore to allow a better seal.

The operation of the present system is best understood by reference to FIGS. 8 and 9 which are diagrammatic representations of the effect of rotation of the inner core 52. The discs represent levels 54, 55, and 56 and the line through each disc represents bore 61. FIG. 8 shows the inner core 52 in its zero degree position and its 180 degree position. FIG. 9 shows the inner core 52 as it is moved to its 90 degree position or its 270 degree position. As described in detail below, the result of the change from FIG. 8 to FIG. 9 is a cyclic reversal in flow through the absorption system.

Referring first to FIG. 8, position of valve 37 allows the flow of gas entering line 31 to pass through bore 61 to line 39. Correlating this with FIG. 5, the stream then passes through sorption bed 40 and line 44 and is then divided between line 47 and cooler 46. The proportion of the division is controlled by valve 49. Referring back to FIG. 8, the stream from line 47 passes through bore 61 in level 56 into manifold 36 and out slip stream line 33. The portion of the stream from cooler 40 does not pass through line 48 as line 48 is blocked at level 56 in the valve, but rather passes through line 45, sorption bed 43, and line 42 to level 55 of the valve 37. It then passes down bore 61 and out output line 32. The result of this gas flow as in the device shown in FIG. 3, is a non-steady state accumulation of impurity between the sorption beds, and subsequent enriching of the slip stream which exists from line 33, and a purification of the exit gas which leaves output line 32.

This non-steady state effect is useful for a specific period of time, and the rotation speed of the inner core is set so that the passage of bore 61 across the opening of the bore 57 is equal to that time. As the valve moves from the position shown in FIG. 8 to the position shown in FIG. 9, an intermediate point is reached at which time the valve is completely sealed and no flow takes place. In situations where steady flow is necessary accumulators would be provided in input and output lines.

As the valve moves from the intermediate position into the position shown figuratively by FIG. 9, the flow through the sorption system is reversed. The stream entering line 31 passes along manifold 34 through bore 61, through manifold 41 to line 42. From there it enters sorption bed 43 and passes along line 45 to be split into lines 48 and cooler 46. The portion that goes along line 48 passes through level 56 to manifold 36 and out slip stream line 33. The portion that passes into the cooler enters line 44 and sorption bed 40. Then it enters line 39, manifold 38, and level 55. The stream continues through manifold 35 and out line 32. It can be seen that continued rotation of the inner core 52 results in an effective return to the position shown in FIG. 8 and as this rotation continues the cyclic reversal of flow continuously rejuvenates the system.

The term "geometric axis" is used herein to mean the geometric line about which a body rotates.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. An adsorption system for removing an impurity from a hot fluid stream, comprising:
 (a) a cooler placed in the stream,
 (b) a first body of sorbent placed in the stream, upstream of the cooler,
 (c) a second body of sorbent in the stream, downstream of the cooler,
 (d) first means for exchanging the positions of the bodies relative to the stream, the means including a drum rotatable on an axis, the drum being divided into a plurality of flow paths which pass through its geometric axis and through which the stream passes, and (e) a slip stream means for extracting a portion of the stream from between the bodies of sorbent.

2. A system as recited in claim 1, wherein the paths are generally perpendicular to the axis.

3. A system as recited in claim 1, wherein the drum carries the sorbent.

4. A system as recited in claim 1, wherein the drum is enclosed in a shell and driving means is provided to rotate the drum with respect to the shell in a continuous preselected pattern, the drum having a plurality of separated, axially spaced path levels, at least two of the levels controlling separate parts of the stream.

5. A system as recited in claim 4, wherein the shell has levels corresponding to those of the drum, at least one level of the shell having a first set of at least two openings and a second set of at least two openings, and rotation of the drum causes simultaneous communication between all of the openings in each set but never communication between the sets.

6. An adsorption system for removing an impurity from a fluid stream, comprising:

(a) a first body of sorbent, (b) a second body of sorbent, (c) a control means which controls the flow of streams through the bodies and controls activations of the bodies, the means including a drum rotatable on an axis, the drum being divided into a plurality of flow paths which pass completely through the drum along a line through and perpendicular to the geometric axis of the drum, the stream passing through the paths from time to time.

7. A system as recited in claim 6, wherein the drum carries the sorbent.

8. A system as recited in claim 6, wherein the drum is enclosed in a shell and driving means is provided to rotate the drum with respect to the shell in a continuous preselected pattern, the drum having a plurality of separated, axially spaced path levels, at least two of the levels controlling separate parts of the stream.

9. A system as recited in claim 8, wherein the shell has levels corresponding to those of the drum, at least one level of the shell having a first set of at least two openings and a second set of at least two openings, and rotation of the drum causes simultaneous communication between all of the openings in each set but never communication between the sets.

* * * * *